(12) United States Patent
Agrawal et al.

(10) Patent No.: US 8,833,974 B2
(45) Date of Patent: Sep. 16, 2014

(54) PHOTOLUMINESCENT ILLUMINATOR

(75) Inventors: Satish Agrawal, Concord, MA (US);
Edward D. Kingsley, Stow, MA (US);
Robert Winskowicz, North Andover, MA (US)

(73) Assignee: Performance Indicator, LLC, Lowell, MA (US)

( * ) Notice: Subject to any disclaimer, the term of this patent is extended or adjusted under 35 U.S.C. 154(b) by 266 days.

(21) Appl. No.: 13/332,824

(22) Filed: Dec. 21, 2011

(65) Prior Publication Data

US 2012/0155089 A1   Jun. 21, 2012

Related U.S. Application Data

(60) Provisional application No. 61/425,514, filed on Dec. 21, 2010.

(51) Int. Cl.
*F21V 9/16*  (2006.01)
*C09K 11/77*  (2006.01)
*F21K 2/00*  (2006.01)

(52) U.S. Cl.
CPC ............... *C09K 11/7792* (2013.01); *F21K 2/00* (2013.01)
USPC .............. 362/293; 362/84; 362/260

(58) Field of Classification Search
USPC ............. 362/260, 84, 34, 293, 583, 510, 2, 362/217.08, 217.09; 156/67
See application file for complete search history.

(56) References Cited

U.S. PATENT DOCUMENTS

| | | | |
|---|---|---|---|
| 5,424,006 A | 6/1995 | Murayama et al. | |
| 5,721,603 A * | 2/1998 | De Vaan et al. | 349/194 |
| 6,117,362 A | 9/2000 | Yen et al. | |
| 6,267,911 B1 | 7/2001 | Yen et al. | |
| 6,798,469 B2 * | 9/2004 | Kimura | 349/61 |
| 6,953,536 B2 | 10/2005 | Yen et al. | |
| 2001/0055208 A1 * | 12/2001 | Kimura | 362/260 |

* cited by examiner

*Primary Examiner* — Bao Q Truong
(74) *Attorney, Agent, or Firm* — Cantor Colburn LLP

(57) ABSTRACT

An illuminator and a method for fabricating the illuminator are disclosed. The illuminator comprises at least a light source and a discriminator. The light source comprises one or more luminescent layers that substantially convert the energy of a primary electromagnetic radiation to an output radiation. The discriminator comprises one or more layers that substantially transmit the primary electromagnetic radiation to the one or more luminescent layers and reflect at least a portion of the output radiation from the one or more luminescent layers to the viewing hemisphere. A method for applying the illuminator to an object is also disclosed.

29 Claims, 4 Drawing Sheets

US 8,833,974 B2

PHOTOLUMINESCENT ILLUMINATOR

CROSS-REFERENCE TO RELATED APPLICATIONS

This application claims priority to U.S. Provisional Patent Application Ser. No. 61/425,514, filed Dec. 21, 2010, titled "PHOTOLUMINESCENT ILLUMINATOR," which is incorporated by reference herein in its entirety for all purposes.

BACKGROUND

These teachings relate generally to a lighting system and, more particularly, to an illuminator designed for irradiating confined spaces.

Artificial lighting systems, in many forms, are utilized in the illumination of confined spaces. Typically, artificial energy is required to exercise these lighting systems and as a result, the lighting systems do not lend themselves easy portability. Examples of such artificial energy include, liquid fuel, batteries, or electric cables, coupled to ancillary equipment such as switches, wiring, fixtures, etc. which in turn, require generation and transmission facilities. Furthermore, in order to properly operate these lighting systems considerable installation resources are generally involved. As a result, the use of these lighting systems is substantially limiting and commonly requires significant investment.

There is, therefore, a need for an easily portable lighting system that can efficiently illuminate a confined space without requiring artificial energy sources, such as sources cited above. There is also a need to provide a greatly simplified and self-durable lighting system that does not require heavy installation resources, while still providing efficient illumination to confined spaces. There is a further need for a lighting system that is less expensive than the current lighting systems available.

SUMMARY

The present teachings provide for an illuminator for irradiation of confined spaces without requiring artificial energy sources. The illuminator comprises a light source and a discriminator. The light source comprises one or more luminescent layers that substantially convert the energy of a primary electromagnetic radiation to an output radiation. The discriminator comprises one or more layers that substantially transmit the primary electromagnetic radiation to the one or more luminescent layers and reflect at least a portion of the output radiation from the one or more luminescent layers to the viewing hemisphere. The one or more luminescent layers of the light source comprise at least one or more luminescent materials with an absorption spectrum that at least partially overlaps with that of the primary electromagnetic radiation. In one example, the one or more luminescent materials may comprise one or more phosphorescent materials. In another example, the one or more luminescent materials may comprise one or more phosphorescent materials and one or more fluorescent materials. In certain embodiments, the light source may further include another one or more luminescent layers that comprise one or more fluorescent materials. In another embodiment, the one or more luminescent materials may comprise one or more high persistent phosphorescent materials. The illuminator of the present teachings may further comprise one or more substrate layers that provide physical and structural durability for the illuminator. In addition, the one or more substrate layers are transmissive of at least a portion of radiation, the radiation being at least one of the primary electromagnetic radiation to the one or more luminescent layers or the output radiation from the one or more luminescent layers. The illuminator of the present teachings may further comprise an emission blocking layer that at least substantially transmits the primary electromagnetic radiation to the one or more luminescent layers and absorbs at least a portion of the output radiation that is not emitted or reflected to the viewing hemisphere. In certain constructions, where applicable, the function provided by the emission blocking layer can be incorporated within the discriminator itself. The illuminator of the present teachings may further comprise a masking layer that substantially renders the visible appearance of the illuminator to a desired color, wherein the masking layer is transmissive of at least a portion of the primary electromagnetic radiation. In certain constructions of the illuminator, where applicable, the function provided by the masking layer can be incorporated within the emission blocking layer itself.

The present teachings also provide for a method of fabricating an illuminator. The method of the present teachings comprises forming a light source and overlaying a discriminator over a surface of the light source that is remote to the viewing hemisphere. The light source comprises one or more luminescent layers that substantially convert the energy of a primary electromagnetic radiation to an output radiation. The discriminator comprises one or more layers that substantially transmit the primary electromagnetic radiation to the one or more luminescent layers and reflect at the least a portion of the output radiation from the one or more luminescent layers to the viewing hemisphere. The one or more luminescent layers comprise at least one or more luminescent materials with an absorption spectrum that at least partially overlaps with the primary electromagnetic radiation. The method of the present teachings may further comprise disposing one or more substrate layers onto a surface of the light source that is adjacent to the viewing hemisphere. The one or more substrate layers provide physical and structural durability for the illuminator and transmit at least a portion of the output radiation from the one or more luminescent layers to the viewing hemisphere. The method of the present teachings may further comprise rendering one or more substrate layers onto a surface of the light source that is remote to the viewing hemisphere, prior to overlaying the discriminator. In this instance, the one or more substrate layers provide physical and structural durability for the illuminator and are substantially transmissive of the primary electromagnetic radiation to the one or more luminescent layers and the output radiation from the one or more luminescent layers. The method of the present teachings may also comprise applying one or more substrate layers over at least a surface of the discriminator that is remote to the light source. In this case, the one or more substrate layers provide physical and structural durability for the illuminator and transmit at least a portion of the primary electromagnetic radiation to the one or more luminescent layers. The method of the present teachings may further comprise overlaying an emission blocking layer over at least a surface of the discriminator that is distant to the light source. The emission blocking layer at least substantially transmits the primary electromagnetic radiation to the one or more luminescent layers and absorbs at least a portion of the output radiation that is not emitted or reflected to the viewing hemisphere. The method of the present teachings may further comprise disposing a masking layer over at least a surface of the discriminator that is remote to the light source. The masking layer substantially renders the visible appearance of the illuminator to a desired color and transmits at least a portion of the primary electromagnetic radiation to the one or more luminescent layers.

The present teachings further provide for a method for applying an illuminator to an object. The method of the present teachings comprises incorporating the illuminator onto or into at least a portion of the object. The illuminator comprises a light source and a discriminator. The light source comprises one or more luminescent layers that substantially convert the energy of a primary electromagnetic radiation to an output radiation. The discriminator comprises one or more layers that substantially transmit the primary electromagnetic radiation to the one or more luminescent layers and reflect at least a portion of the output radiation from the one or more luminescent layers to the viewing hemisphere. The illuminator of the present teachings may further comprise one or more substrate layers that provide physical and structural durability for the illuminator. In addition, the one or more substrate layers are transmissive of at least a portion of radiation, the radiation being at least one of the primary electromagnetic radiation to the one or more luminescent layers or the output radiation from the one or more luminescent layers. The illuminator of the present teachings may further comprise an emission blocking layer that at least substantially transmits the primary electromagnetic radiation to the one or more luminescent layers and absorbs at least a portion of the output radiation that is not emitted or reflected to the viewing hemisphere. The illuminator of the present teachings may further comprise a masking layer that substantially renders the visible appearance of the illuminator to a desired color and transmits at least a portion of the primary electromagnetic radiation to the one or more luminescent layers.

BRIEF DESCRIPTION OF THE DRAWINGS

The present teachings are illustratively shown and described in reference to the accompanying drawings, in which.

DETAILED DESCRIPTION

Figure 1:
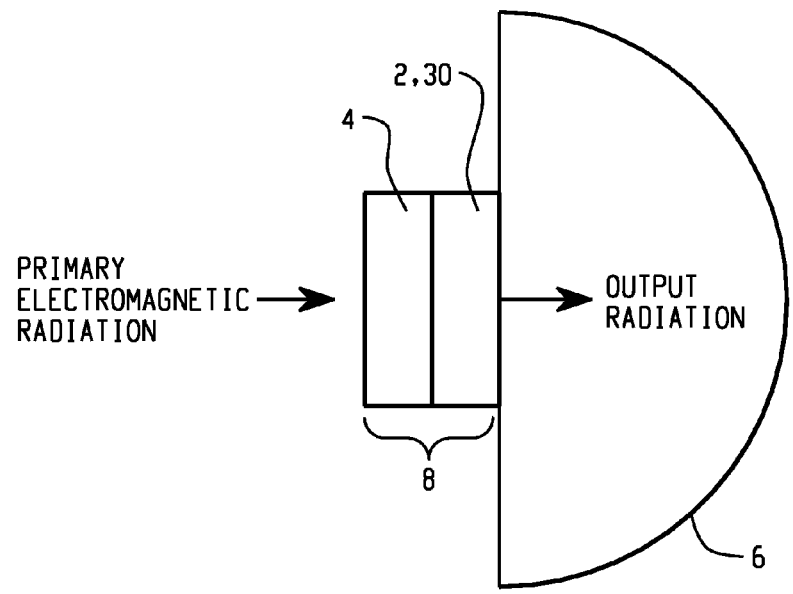
FIG. 1 is a schematic drawing of an illuminator according to one embodiment of these teachings.

Disclosed herein are present teachings directed to an illuminator that is easily portable, capable of efficiently illuminating a confined space without the use of artificial energy sources, self-durable and less expensive than known lighting systems. In addition, the illuminator may be used in a variety of applications and environmental conditions.

For a better understanding of the disclosure the following terms are herein defined:

The term "luminescence" is defined as the emission of electromagnetic radiation from any substance. Luminescence occurs from electronically excited states that can be divided into singlet states and triplet states.

"Luminescent layers" or "Luminescent materials" are those which exhibit luminescence, that is, emit electromagnetic radiation. Characterizing luminescent layers or luminescent materials requires consideration of (1) the excitation source, (2) the nature of the emission, and (3) whether or not additional stimulation is required to cause emission.

With regard to the excitation source, luminescent layers or luminescent materials excited by electromagnetic radiation are referred to herein as "photoluminescent." Luminescent layers or luminescent materials excited by electrical energy are referred to herein as "electroluminescent." Luminescent layers or luminescent materials excited by a chemical reaction are referred to herein as "chemiluminescent."

With regard to the nature of the emission, this may be either fluorescence or phosphorescence. A "fluorescent" material stores electromagnetic radiation and releases it rapidly, generally in about $10^{-8}$ seconds or less, in a process that does not invoke a change in the electronic spin state of the molecule. Fluorescence from organic molecules typically occurs from excited singlet states. Contrarily, a "phosphorescent" material stores electromagnetic radiation and releases it gradually, in about $10^{-6}$ seconds or greater, in a process that requires a change in the electronic spin state of the molecule.

"Primary electromagnetic radiation" refers to electromagnetic radiation that excites a molecule from a lower energy state to a higher energy state.

"Viewing hemisphere" refers to the area in which output radiation is perceived.

"Liquid carrier medium" is a liquid that acts as a carrier for materials distributed in a particulate state and/or dissolved therein. Such materials include, but are not limited to, polymers, luminescent materials, rheology modifiers, and wetting agents.

A "formulation" is a homogeneous mixture of at least two materials. A formulation can be one or more materials, dissolved or dispersed in a liquid carrier medium, as defined above, such as a luminescent material dissolved and/or dispersed in a liquid carrier medium, or a polymer dissolved in a liquid carrier medium, etc.

A "solid state solution," as used herein, is a homogenous mixture of one or more luminescent materials and a polymer that are both in a dry state. One way of achieving this homogenous mixture is to dissolve one or more luminescent materials and a polymer in a liquid carrier medium and then dry the combination to remove the liquid carrier medium. Such a homogeneous mixture may also result from subjecting a combination of one or more luminescent materials and polymer to elevated temperatures. Note that for a homogeneous mixture to form in a dry state, the one or more luminescent materials and polymer have to be compatible, otherwise a homogeneous mixture will not result.

A "film" is a thin skin or membrane that can be rigid or flexible. An example of this is a layer resulting from the application of a formulation and drying it. One or more layers can then constitute a film.

"Interference pigments," as used herein, are a combination of thin, smooth platelets that are transmissive of at least a portion of the primary electromagnetic radiation, as defined above, as well as reflective of at least a portion of the primary electromagnetic radiation, as defined above. To achieve maximum reflectivity, the platelets must be aligned substantially parallel to each other.

A "prismatic lens," as used herein, is a lens in the form of a prescribed prism. A "microprismatic film," as used herein, is a film having an array of small prismatic lenses formed on a surface of the film. A microprismatic film can be, in one exemplary embodiment, but is not restricted to this exemplary embodiment, an array of micro Fresnel lenses.

In general, the illuminator, according to the present teachings, functions as a lighting system that is exposed to primary electromagnetic radiation and then substantially converts the primary electromagnetic radiation to an output radiation. The illuminator, according to the present teachings, may be either a planar or non-planar structure. However, for illustrative purposes only, each illuminator generally presented herein, is a planar structure. In these embodiments, the illuminator includes at least two co-planar elements, a light source and a discriminator. In regard to possible applications of the present invention, such applications will involve at least one illuminator.

FIG. 1 presents a schematic illustration of one embodiment of the illuminator (8) according to the present teachings. In this embodiment, the illuminator (8) comprises a light source (2) and a discriminator (4). The light source (2) comprises one or more luminescent layers (30) that enable the light source (2) to substantially convert the primary electromagnetic radiation to an output radiation. The discriminator (4) comprises one or more layers that allow for substantial transmission of the primary electromagnetic radiation to the one or more luminescent layers (30) of the light source (2). In addition, the discriminator (4) reflects at least a portion of the output radiation to the viewing hemisphere (6).

Figure 1A:
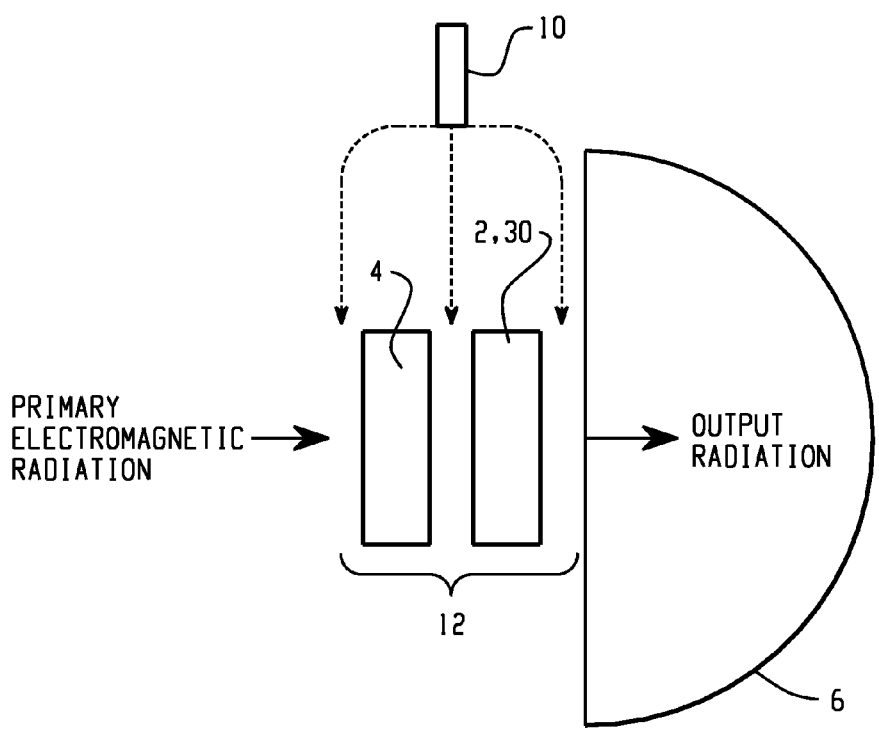
FIG. 1A is an exploded schematic drawing of an illuminator according to a second aspect of these teachings, illustrating the possible locations of one or more substrate layers.

FIG. 1A represents another embodiment of the illuminator (12), according to the present teachings. In this embodiment, the illuminator (12) comprises the light source (2), the discriminator (4), and one or more substrate layers (10). The one or more substrate layers (10) provide physical and structural durability for the illuminator (12). In addition, the one or more substrate layers (10), depending on the location within the illuminator (12), are transmissive of at least a portion of the primary electromagnetic radiation to the one or more luminescent layers (30) of the light source (2), or at least a portion of the output radiation from the one or more luminescent layers (30) of the light source (2), or both. As illustrated in FIG. 1A, the one or more substrate layers (10) may be located within one or more locations of the illuminator (12), such as, on the surface of the discriminator (4) that is closest to the primary electromagnetic radiation, between the adjacent surfaces of the discriminator (4) and light source (2), or on the surface of the light source (2) that is adjacent to the viewing hemisphere (6). For example, one substrate layer (10) may be positioned between the adjacent surfaces of the discriminator (4) and light source (2) and a second substrate layer (10) may be positioned on the surface of the light source (2) that is closest to the viewing hemisphere (6).

Figure 2:
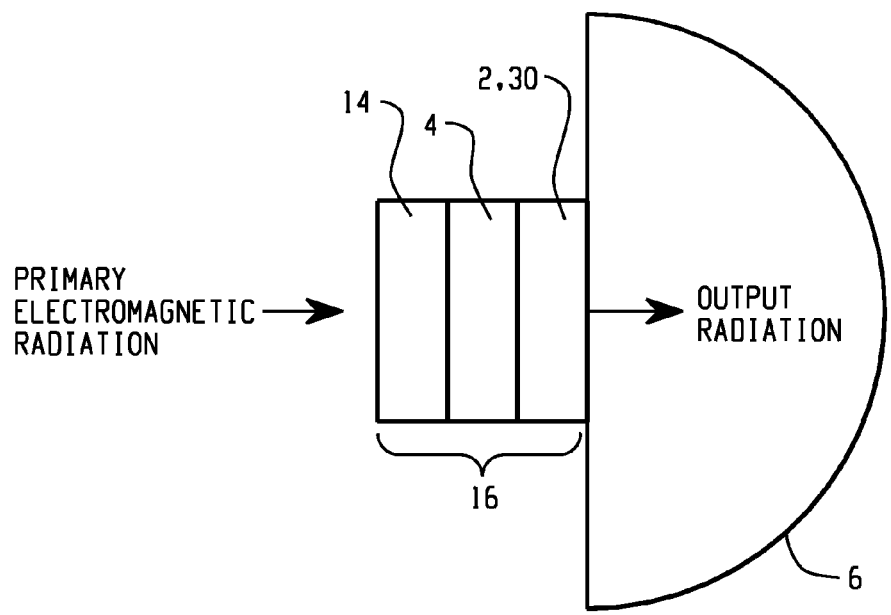
FIG. 2 is schematic drawing of another embodiment of an illuminator, in accordance with these teachings.

Referring now to FIG. 2, the illuminator (16) according to the present teachings may further comprise an emission blocking layer (14). The emission blocking layer (14) substantially transmits the primary electromagnetic radiation to the one or more luminescent layers (30) of the light source (2) and absorbs at least a portion of the output radiation that is not emitted or reflected to the viewing hemisphere (6). The emission blocking layer (14) may additionally render the visible appearance of the illuminator (16) to a desired color. Furthermore, the emission blocking layer (14) may additionally emit radiation that is not substantially in the visible domain of the electromagnetic spectrum.

Figure 2A:
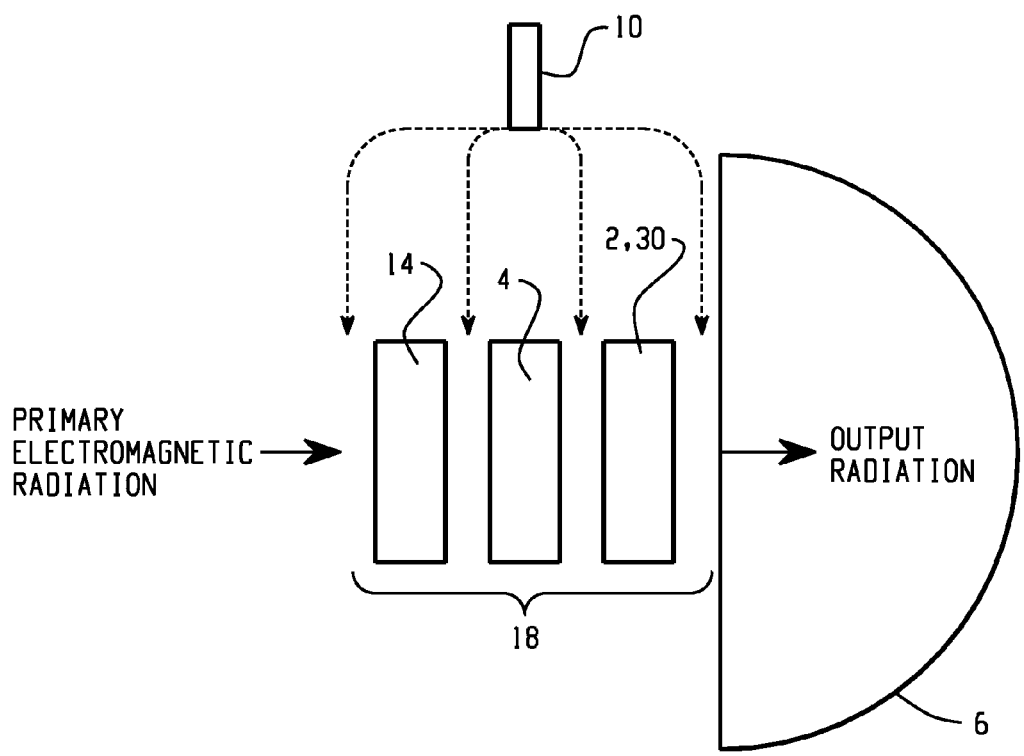
FIG. 2A is an exploded schematic drawing of an illuminator according to another aspect of these teachings, illustrating the possible locations of one or more substrate layers.

With reference to FIG. 2A, the illuminator (18) in addition to the emission blocking layer (14), may further comprise one or more substrate layers (10). As illustrated in FIG. 2A, exemplary locations to apply the one or more substrate layers (10) within the illuminator (18) include at least one of the following: the surface of the emission blocking layer (14) that is nearest to the primary electromagnetic radiation, between the neighboring surfaces of the emission blocking layer (14) and the discriminator (4), between the surfaces of the discriminator (4) and the light source (2), or the surface of the light source (2) that is adjacent to the viewing hemisphere (6).

Figure 3:
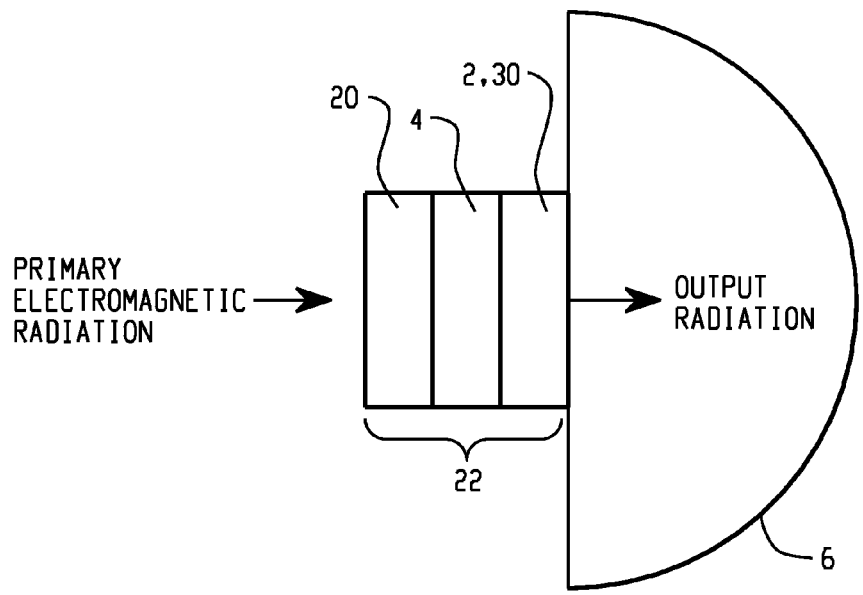
FIG. 3 is a schematic illustration of an illuminator according to another embodiment of these teachings.

Referring now to FIG. 3, the illuminator (22) according to the present teachings may further comprise a masking layer (20). The masking layer (20) substantially renders the visible appearance of the illuminator (22) to a desired color, as well as transmits at least a portion of the primary electromagnetic radiation to the one or more luminescent layers (30) of the light source (2).

Figure 3A:
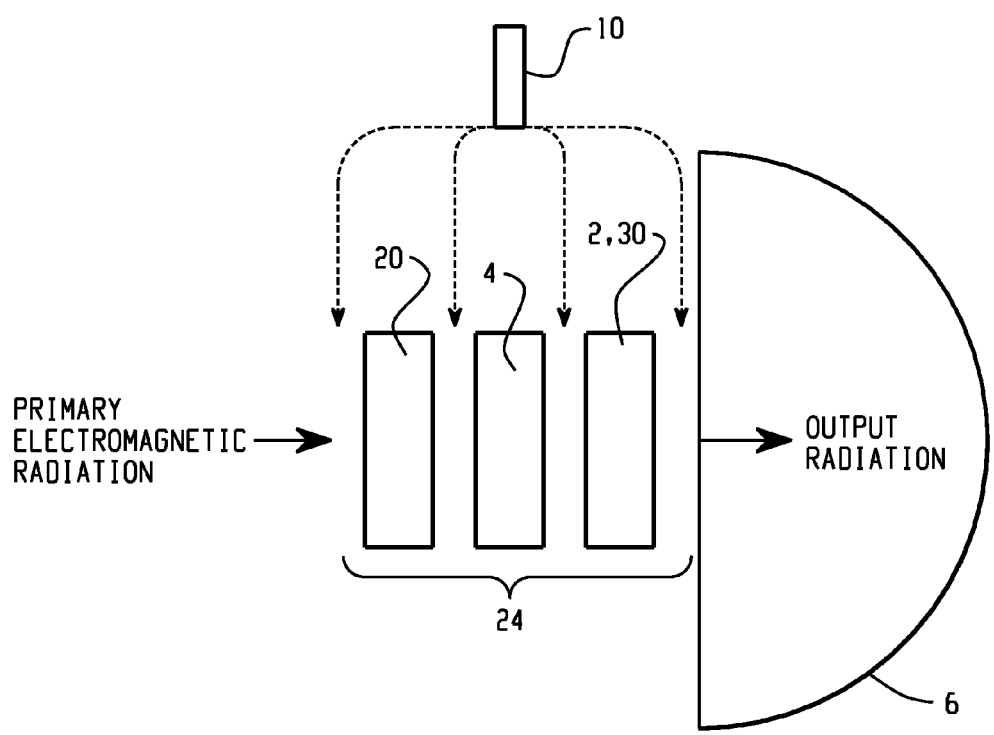
FIG. 3A is an exploded schematic illustration of an illuminator according to another aspect of these teachings and shows the potential locations of one or more substrate layers.

With reference to FIG. 3A, the illuminator (24) in addition to a masking layer (20) may further comprise one or more substrate layers (10). The one or more substrate layers (10) may be located in one or more locations within the illuminator (24), as illustrated in FIG. 3A. The one or more substrate layers (10) may be applied to a surface of at least one of the masking layer (20) that is closest to the primary electromagnetic radiation, between the masking layer (20) and the discriminator (4), between the discriminator (4) and the light source (2), or the light source (2) that is adjacent to the viewing hemisphere (6).

Figure 4:
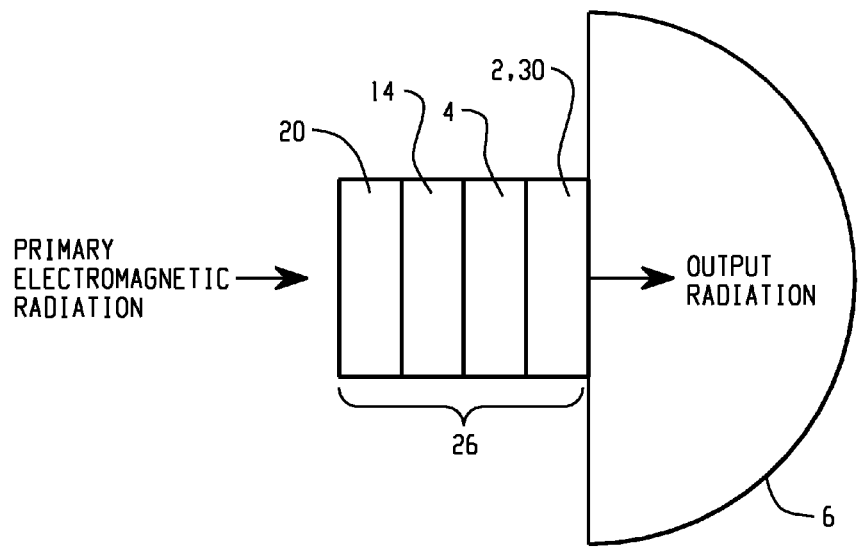
FIG. 4 is a schematic illustration of an illuminator according to another embodiment of these teachings.

FIG. 4 illustrates another embodiment of the invention, according to the present teachings. The illuminator (26) in addition to the light source (2) and the discriminator (4), may also comprise both the emission blocking layer (14) and the masking layer (20).

Figure 4A:
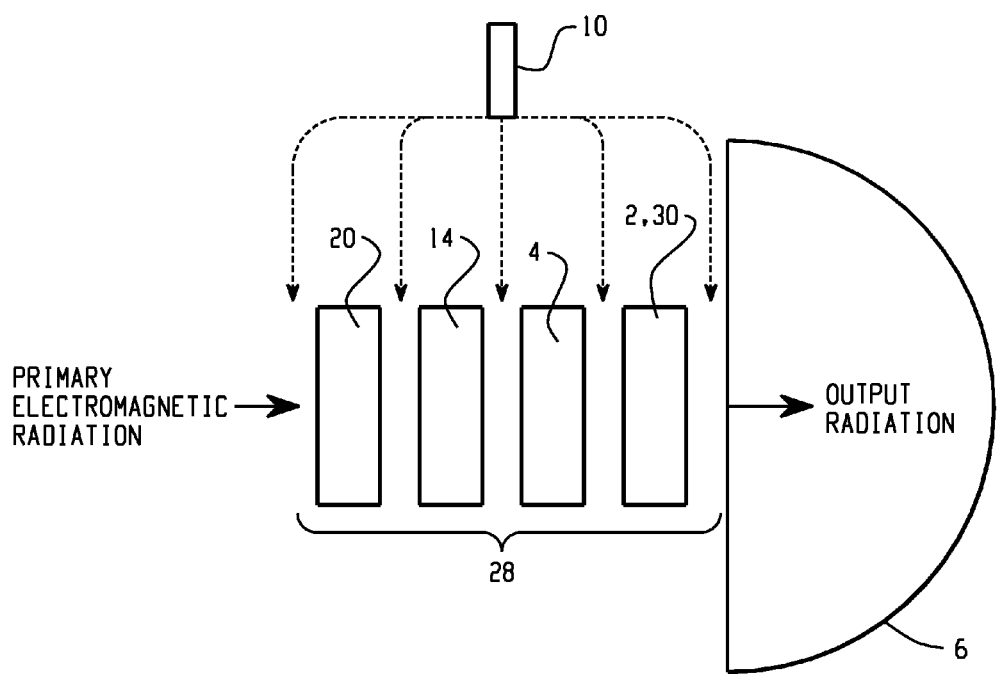
FIG. 4A is an exploded schematic drawing of an illuminator according to another embodiment of these teaching and illustrates the possible locations of one or more substrate layers.

With reference to FIG. 4A, the illuminator (28) may additionally comprise one or more substrate layers (10), along with the emission blocking layer (14) and the masking layer (20). As illustrated in FIG. 4A, the one or more substrate layers (10) may be located in various areas of the illuminator (28), such as, on the surface of the masking layer (20) that is nearest to the primary electromagnetic radiation, between the neighboring surfaces of the masking layer (20) and the emission blocking layer (14), between the surfaces of the emission blocking layer (14) and the discriminator (4), between the surfaces of the discriminator (4) and the light source (2), or on the surface of the light source (2) that is adjacent to the viewing hemisphere (6).

Light Source—Details:

The one or more luminescent layers within the light source of the illuminator, according to the present teachings, comprise at least one or more luminescent materials that are selected based on their absorption and emission properties. In order for the one or more luminescent layers to efficiently convert at least a portion of the primary electromagnetic radiation, the one or more luminescent materials must have an absorption spectrum that partially overlaps with that of the primary electromagnetic radiation. Preferably, the one or more luminescent materials are at least one or more phosphorescent materials, such as photoluminescent phosphorescent materials. Useful photoluminescent phosphorescent materials include, but are not limited to, doped alkaline earth aluminate photoluminescent pigments having the formula $MAl_2O_4$:Eu,Dy/Nd where M is an alkaline earth element or mixture of elements. Specific examples of such doped alkaline aluminum oxides include strontium aluminum oxide, $SrAl_2O_4$:Eu,Dy, calcium aluminum oxide, $CaAl_2O_4$:Eu,Dy/Nd, and mixtures of the alkaline earth elements thereof. These aluminate phosphors may also contain charge compensating elements such as zinc or magnesium. High-intensity, high persistent photoluminescent phosphors such as alkaline earth aluminate photoluminescent materials that are doped with europium and co-doped with one or more elements chosen from the Lanthanide series of elements are also useful in these materials. Additional phosphorescent materials that are useful in the current invention are those or similar to those described in U.S. Pat. Nos. 5,424,006, 6,117,362, 6,267,911 and 6,953,536, which are incorporated by reference herein in their entirety.

The one or more luminescent materials, according to the present teachings, may further include one or more fluorescent materials. The functions of the one or more fluorescent materials are to increase the overall luminous intensity of the light source, or alter the output radiation from the one or more luminescent layers, or both. Preferably, photoluminescent fluorescent materials are used. The one or more fluorescent materials can be combined with the one or more phosphorescent materials in the same one or more luminescent layers. Alternatively, the one or more fluorescent materials can be included within separate one or more luminescent layers. In these cases, the one or more fluorescent materials are selected such that their absorbance spectrum at least partially overlaps with the primary electromagnetic radiation and/or the emission of the one or more of the luminescent materials utilized in the one or more luminescent layers. Suitable fluorescent materials include, but are not limited to, coumarin dyes, rhodamine dyes, phenoxazones, styryls, carbostyryls, stilbenes, oxazines, cyanine dyes, pyrromethene dyes, perylene dyes, and fluorescein dyes.

A balance of types of luminescent materials may be provided so as to increase a certain property of the light source. For example, one or more fluorescent materials may be included within one or more luminescent layers to substantially absorb any primary electromagnetic radiation that may not be absorbed by another one or more luminescent materials within the one or more luminescent layers. Furthermore, the one or more fluorescent materials may be chosen to substantially absorb the primary electromagnetic radiation and to emit radiation that is more efficiently absorbed by another one or more luminescent materials included in the one or more luminescent layers. Depending on the properties of the one or more luminescent materials utilized within the illuminator, the output radiation of the light source can be infrared, visible, ultraviolet, or any combination thereof. In general, additional equipment is not required to perceive the output radiation of the light source. However, in certain instances where the output radiation is substantially in the infrared or the ultraviolet, detection apparatuses, such as a night vision apparatus, may be needed to observe the output radiation.

Light Source—Preparation Methods:

A variety of methods can be used to prepare effective one or more luminescent layers of the light source. Such methods may include, coating a formulation, comprising one or more luminescent materials in a liquid carrier medium, onto a support. For example, such coatings can be deposited by painting, screen printing, spraying, slot coating, dip coating, roller coating and bar coating.

In addition, the one or more luminescent layers may be prepared by methods that involve a solid state solution. For example, a solid state solution of one or more luminescent materials in a polymer can be converted to a luminescent layer by extrusion, injection molding, compression molding, calendaring, and thermoforming. When the light source comprises a combination of several different luminescent layers, the individual layers can be sequentially coated, or the individual layers can be separately prepared and later laminated or embossed together to form the light source. Alternatively, the light source can be prepared by co-extrusion of the individual luminescent layers.

Discriminator—Details:

In order for the illuminator to efficiently irradiate a confined space or spaces, the output radiation of the one or more luminescent layers should emit in the direction of the viewing hemisphere. Therefore, it is important, especially in the case where the one or more luminescent materials are isotropic emitters, to redirect any backward propagating output radiation from the one or more luminescent layers, towards the viewing hemisphere. In order to minimize any backward propagation of the output radiation, the illuminator of the present teachings, further includes the discriminator. The discriminator comprises one or more layers that substantially transmit the primary electromagnetic radiation to the one or more luminescent layers, as well as reflect at least a portion of any output radiation that is not emitted in the direction of the viewing hemisphere.

For the discriminator to effectively transmit and reflect, the one or more layers of the discriminator comprise at least one of one or more light scattering materials, an interference filter, a microprismatic film, one or more interference pigments, or any combination thereof. Acceptable light scattering materials include, but not are limited to, mica and solid or hollow glass beads. Microprismatic films useful in the present invention include, but are not limited to, brightness enhancing films. In certain embodiments of the present invention, it may be preferable to combine various optical variable elements within the same one or more layers of the discriminator.

Discriminator—Preparation Methods:

A variety of methods can be used to prepare effective one or more layers of the discriminator. Such methods may include, coating a formulation comprising one or more light scatterers that include, but are not limited to, hollow or solid glass spheres, in a liquid carrier medium onto a support. For example, such coatings can be deposited by painting, screen printing, spraying, slot coating, dip coating, roller coating and bar coating. When the discriminator comprises a combination of several different layers, the individual layers can be sequentially coated, or the individual layers can be separately prepared and later laminated or embossed together to form the discriminator. Alternatively, the discriminator can be prepared by co-extrusion of the individual layers.

Substrate Layer or Layers—Details:

The illuminator of the present teachings may also comprise one or more substrate layers to provide physical and structural durability for the illuminator upon environmental exposure. Since the material properties of the illuminator render it sensitive to normal physical and structural wear and degradation, the robustness of the illuminator is improved by the addition of the one or more substrate layers. In addition, the one or more substrate layers are transmissive of at least a portion of radiation, the radiation being at least one of the primary electromagnetic radiation to the one or more luminescent layers or the output radiation from the one or more luminescent layers. Useful substrate materials for the present invention include, but are not limited to, polyethylene-terephthalate, polyolefins, polysulfones, cellulose esters such as cellulose acetate, cellulose propionate and cellulose butyrates, polycarbonates, polyimides and glass.

Emission Blocking Layer—Details:

In some aspects of the present teachings it may be desirable to substantially eliminate any portion of the output radiation from emitting in any other hemisphere other than that of the viewing hemisphere. Therefore, the illuminator of the present teachings may further comprise an emission blocking layer. The emission blocking layer comprises materials that at least substantially transmit the primary electromagnetic radiation to one or more luminescent layers of the light source and absorb at least a portion of the output radiation that is not emitted or reflected to the viewing hemisphere. In addition, the emission blocking layer, where applicable, may function as a masking layer described herein. Suitable materials for the emission blocking layer include, but are not limited to, various Lumogen® dyes, available from BASF, anthroquinones such as the Unisol® dyes, available from Fluka, copper phthalocyanine based dyes, and pigments.

Emission Blocking Layer—Preparation Methods:

A variety of methods can be used to prepare an effective emission blocking layer. Such methods may include, coating a formulation comprising one or more visible light absorbers that include, but are not limited to, pigments and/or dyes, in a liquid carrier medium onto a support. For example, such coatings can be deposited by painting, screen printing, spraying, slot coating, dip coating, roller coating and bar coating.

Another method that may be used for preparing an emission blocking layer is to make an interference filter by vacuum depositing alternate layers of metals and/or metal oxides that have different refractive indices onto a polycarbonate substrate. The number and thicknesses of these layers is determined by the desired optical properties of the interference filter.

Masking Layer—Details:

In certain aspects of the present teachings, due to the materials utilized, it may be desirable to render the visual appearance of the illuminator to a desired color through the use of a masking layer. In certain embodiments, this may be done for the purpose of camouflaging the illuminator, either by adjusting the color of the illuminator to blend in with the surroundings or by including shape disruptive patterns on the surface of the masking layer that is closest to the primary electromagnetic radiation. The materials used within this masking layer must be substantially transmissive of the primary electromagnetic radiation. Useful masking layer materials include, but not are limited to, various Lumogen® dyes, available from BASF, anthroquinones such as the Unisol® dyes, available from Fluka, copper phthalocyanine based dyes, and pigments.

Masking Layer—Preparation Methods:

A variety of methods can be used to prepare an effective masking layer. Such methods may include, coating a formulation comprising one or more visible light absorbers that include, but are not limited to, pigments and/or dyes, in a liquid carrier medium onto a support. For example, such coatings can be deposited by painting, screen printing, spraying, slot coating, dip coating, roller coating and bar coating.

Other Additives:

It should be noted that additional components, where applicable, may be added to any one of the aforementioned layers included in the illuminator of the present teachings, to help facilitate dissolution, dispersion and coating of the materials. Such additional components include, but are not limited to, wetting agents, dispersion agents, rheological agents, stabilizing agents, antioxidant, leveling agents, or any combination thereof. Furthermore, any one or more layers of the illuminator may further include photostabilizing material in order to minimize photolytic degradation of the one or more luminescent materials.

The methods for which the illuminator of the present teachings may be fabricated include, for example, constructing each layer separately followed by laminating the layers together in a pre-determined order using pressure and or heat. Alternatively, individual layers of the illuminator may be sequentially deposited or coated. For example, coating and drying layer one, then coating and drying layer two onto layer one, etc. until all the desired layers of the illuminator are achieved. Furthermore, one may choose to combine the two previously disclosed methods such that, certain one or more layers of the illuminator are constructed separately and then laminated, after which additional individual one or more layers are sequentially deposited and dried over the one or more laminated layers. Coating methods may include any method known in the art including, but not limited to, reverse roller coating, slot coating, screen coating, wire bar coating, curtain coating, spray coating, vacuum depositions, sputtering and dip coatings. Alternatively, the illuminator can be prepared by co-extrusion of the individual layers.

The illuminator, according to the present teachings, may be utilized in a variety of applications such as, irradiating confined spaces within an object, wherein the illuminator of the present teachings is incorporated into or onto at least a portion of the object. For example, the illuminator can be integrated into or onto at least a portion of the object while the object is being manufactured, the illuminator can be built onto at least a portion of the object, the illuminator can be affixed onto at least a portion of the object, the illuminator can be inserted into at least a portion of the object, or any combination thereof. Applicable objects include, but are not limited to, a housing structure, a marine structure, a storage apparatus, or any type of a mobile structure. Examples of a housing structure include, but are not limited to, a house, a tent, or a building. Examples of a storage apparatus include, but are not limited to, a container, a backpack, a briefcase, a purse, a box, or a trunk.

EXEMPLIFICATIONS

The present teachings, having been generally described, will be more readily understood by reference to the following examples, which are included merely for purposes of illustration of certain aspects and embodiments of the present teachings, and are not intended to limit the scope of these teachings.

Example 1

An Illuminator Comprising a Single Layer Light Source and a Single Layer Discriminator Preparation of the Light Source (Film A): A formulation comprising 124 grams of toluene admixed with 76 grams of Elvacite 2014 (NeoResins), 190 grams of a commercial green phosphor (strontium aluminate doped with Eu and Dy), 7.6 grams of Plasthall 680 plasticizer, 2 grams of TegoWet 270 and 2 grams of TegoFoamex N. The composition was mixed for 60 minutes. The formulation was then coated on a release base using a draw down applicator (15 mils wet coating thickness, 6 mils dry coating thickness). This coating was then dried in a convection oven at 40° C. for 1 hour followed by 80° C. for 4 hours to yield a film.

Preparation of the Discriminator (Film B): A formulation comprising 124 grams of toluene admixed with 76 grams of Elvacite 2014 (NeoResins), 19 grams of a Sphericel 110P80 hollow glass spheres (Potter's Industries), 7.6 grams of Plasthall 680 plasticizer, 1.1 grams of TegoWet 270 and 1.1 grams of TegoFoamex N. The composition was mixed for 60 minutes. The formulation was then coated on a release base using a draw down applicator (15 mils wet coating thickness, 6 mils dry coating thickness). This coating was then dried in a convection oven at 40° C. for 1 hour followed by 80° C. for 4 hours to yield a film.

The coated surface of Film A was laminated to the coated surface of Film B at 270° F. at a roller speed of 3 ft. per minute. After lamination, the release bases were removed to provide the illuminator comprising a light source and a discriminator.

Example 2

An Illuminator Comprising a Single Layer Light Source, a Single Layer Discriminator, and an Emission Blocking Layer Preparation of the Light Source (Film A): Prepared as in Example 1.

Preparation of the Discriminator (Film B): Prepared as in Example 1.

Preparation of the Emission Blocking Layer (Film C): A formulation comprising 124 grams of toluene admixed with 47 grams of Elvacite 2014 (NeoResins), 0.1 grams of Lumogen Yellow F-170 dye (BASF), 0.1 grams Lumogen Red F-305 dye (BASF), 0.1 grams Unisol Blue dye (Sigma Aldrich), 4.7 grams of Plasthall 680 plasticizer, 1.1 grams of TegoWet 270 and 1.1 grams of TegoFoamex N. The composition was mixed for 60 minutes. The formulation was then coated on a release base using a draw down applicator (15 mils wet coating thickness, 6 mils dry coating thickness). This coating was then dried in a convection oven at 40° C. for 1 hour followed by 80° C. for 4 hours to yield a film.

The coated surface of Film A was then laminated onto the coated surface of Film B at 270° F. at a roller speed of 3 ft. per minute. The release base was removed from Film B and the coated surface of Film C was then laminated onto Film B at 270° F. at a roller speed of 3 ft. per minute. After lamination, the remaining release bases were removed to yield an illuminator comprising a light source, a discriminator and an emission blocking layer.

Example 3

An Illuminator Comprising a Single Layer Light Source, a Single Substrate Layer, a Single Layer Discriminator, and a Masking Layer Preparation of the Light Source (Film A): Prepared as in Example 1.

Preparation of the Discriminator (Film B): Prepared as in Example 1.

Preparation of the Substrate Layer (Film D): A 5 mil clear polyester film (DuPont Teijin Melinex® 523)

Preparation of the Masking Layer (Film E): A formulation comprising of 124 grams of toluene admixed with 47 grams of Elvacite 2014 (NeoResins), 0.1 grams Solvent Blue 38 (Sigma Aldrich), 4.7 grams of Plasthall 680 plasticizer, 1.1 grams of TegoWet 270 and 1.1 grams of TegoFoamex N. The composition was mixed for 60 minutes. The formulation was then coated on a release base using a draw down applicator (15 mils wet coating thickness, 6 mils dry coating thickness). This coating was then dried in a convection oven at 40° C. for 1 hour followed by 80° C. for 4 hours to yield a film.

The coated surface of Film A was then laminated onto one surface of Film D at 270° F. at a roller speed of 3 ft. per minute. The coated surface of Film B was then laminated on the opposing side of Film D at 270° F. at a roller speed of 3 ft. per minute. The release base of Film B was removed and the coated surface of Film E was laminated onto Film B at 270° F. at a roller speed of 3 ft. per minute. After lamination, the remaining release bases were removed to yield the illuminator comprising a light source, a discriminator, a substrate layer and a masking layer.

Example 4

An Illuminator Comprising a Single Layer Light Source and a Single Layer Discriminator Preparation of the Light Source (Film A): Prepared as in Example 1.

Preparation of the Discriminator (Film F): An interference filter (Evaporative Coatings, Inc) which transmits all light below 450 nm and above 750 nm and reflects all light between 450 nm and 750 nm at normal incidence. The interference filter is coated on a 5 mil polycarbonate substrate to yield a film.

A transparent thermal adhesive was then applied onto the coated surface of Film A. The coated surface of Film A was then laminated onto the coated surface of Film F at 270° F. at a roller speed of 3 ft. per minute. After lamination, the release bases were removed to yield the illuminator comprising a light source and a discriminator.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended disclosure.

What is claimed is:

1. An illuminator comprising:
   (i) a light source comprising:
      one or more luminescent layers that substantially convert the energy of a primary electromagnetic radiation to an output radiation; wherein the one or more luminescent layers comprise one or more luminescent materials; and wherein said one or more luminescent materials comprise phosphorescent materials; and
   (ii) a discriminator comprising:
      one or more layers that substantially transmit the primary electromagnetic radiation to said one or more luminescent layers and reflect at least a portion of the output radiation from said one or more luminescent layers to the viewing hemisphere; wherein one or more layers of the discriminator comprise one or more light scattering materials.

2. The illuminator of claim 1, wherein said one or more luminescent layers comprise at least one or more luminescent materials with an absorption spectrum that at least partially overlaps with the primary electromagnetic radiation.

3. The illuminator in claim 1, wherein said light source further comprises another one or more luminescent layers, said another one or more luminescent layers comprising: one or more fluorescent materials that increase the luminous intensity of said light source, or alter the output radiation from said one or more luminescent layers, or both.

4. The illuminator of claim 2, wherein said one or more luminescent materials comprise one or more high persistent phosphorescent materials.

5. The illuminator of claim 1, wherein the primary electromagnetic radiation is infrared, visible, ultraviolet, or any combination thereof.

6. The illuminator of claim 1, wherein the output radiation is infrared, visible, ultraviolet, or any combination thereof.

7. The illuminator of claim 1, wherein the primary electromagnetic radiation is ambient light.

8. The illuminator of claim 2, wherein said one or more luminescent materials are at least one of dissolved or dispersed in a liquid carrier medium.

9. The illuminator of claim 2, wherein said one or more luminescent layers further comprises a polymer, wherein said polymer and said one or more luminescent materials are in a solid state solution.

10. The illuminator of claim 1, further comprising one or more substrate layers, said one or more substrate layers provide physical and structural durability for said illuminator.

11. The illuminator of claim 10, wherein said one or more substrate layers are transmissive of at least a portion of radiation, the radiation being at least one of the primary electromagnetic radiation to said one or more luminescent layers or the output radiation from said one or more luminescent layers.

12. The illuminator of claim 1, further comprising an emission blocking layer that at least substantially transmits the primary electromagnetic radiation to said one or more luminescent layers and absorbs at least a portion of the output radiation that is not emitted or reflected to the viewing hemisphere.

13. The illuminator of claim 12, wherein said emission blocking layer is a fluorescent material, an absorptive material, one or more interference pigments, or any combination thereof.

14. The illuminator of claim 1, further comprising a masking layer that substantially renders the visible appearance of said illuminator to a desired color, wherein said masking layer is transmissive of at least a portion of the primary electromagnetic radiation.

15. The illuminator of claim 1, wherein one or more layers of said discriminator comprise at least one of an interference filter, a microprismatic film, one or more interference pigments, or any combination thereof.

16. A method for fabricating an illuminator, the method comprising:
(i) forming a light source comprising:
one or more luminescent layers that substantially convert the energy of a primary electromagnetic radiation to an output radiation; wherein the one or more luminescent layers comprise one or more luminescent materials; and wherein said one or more luminescent materials comprise phosphorescent materials; and
(ii) overlaying a discriminator over a surface of said light source that is remote to the viewing hemisphere, said discriminator comprising:
one or more layers that substantially transmit the primary electromagnetic radiation to said one or more luminescent layers and reflect at least a portion of the output radiation from said one or more luminescent layers to the viewing hemisphere; wherein one or more layers of the discriminator comprise one or more light scattering materials.

17. The method of claim 16, wherein said one or more luminescent layers comprise at least one or more luminescent materials with an absorption spectrum that at least partially overlaps with the primary electromagnetic radiation.

18. The method of claim 16, further comprising disposing one or more substrate layers onto a surface of said light source that is adjacent to the viewing hemisphere, said one or more substrate layers provide physical and structural durability for said illuminator and transmit at least a portion of the output radiation from said one or more luminescent layers to the viewing hemisphere.

19. The method of claim 16, further comprising rendering one or more substrate layers onto a surface of said light source that is remote to the viewing hemisphere prior to overlaying said discriminator, said one or more substrate layers provide physical and structural durability for said illuminator and are substantially transmissive of the primary electromagnetic radiation to said one or more luminescent layers and the output radiation from said one or more luminescent layers.

20. The method of claim 16, further comprising applying one or more substrate layers over at least a surface of said discriminator that is remote to said light source, said one or more substrate layers provide physical and structural durability for said illuminator and transmit at least a portion of the primary electromagnetic radiation to said one or more luminescent layers.

21. The method of claim 16, further comprising overlaying an emission blocking layer over at least a surface of said discriminator that is distant to said light source, wherein said emission blocking layer at least substantially transmits the primary electromagnetic radiation to said one or more luminescent layers and absorbs at least a portion of the output radiation that is not emitted or reflected to the viewing hemisphere.

22. The method of claim 16, further comprising disposing a masking layer over at least a surface of said discriminator that is remote to said light source, wherein said masking layer substantially renders the visible appearance of said illuminator to a desired color and transmits at least a portion of the primary electromagnetic radiation to said one or more luminescent layers.

23. A method for applying an illuminator to an object comprising:
(i) incorporating said illuminator onto or into at least a portion of the object, said illuminator comprising:
a light source that comprises one or more luminescent layers that substantially convert the energy of a primary electromagnetic radiation to an output radiation; wherein the one or more luminescent layers comprise one or more luminescent materials; and wherein said one or more luminescent materials comprise phosphorescent materials; and
a discriminator that comprises one or more layers that substantially transmit the primary electromagnetic radiation to said one or more luminescent layers and reflect at least a portion of the output radiation from said one or more luminescent layers to the viewing hemisphere; wherein one or more layers of the discriminator comprise one or more light scattering materials.

24. The method of claim 23, wherein incorporating is integrating said illuminator into or onto at least a portion of the object during the manufacture of the object, building said illuminator onto at least a portion of the object, affixing said illuminator onto at least a portion of the object, inserting said illuminator into at least a portion of the object, or any combination thereof.

25. The method of claim 23, wherein the object is a housing structure, a marine structure, a storage apparatus, or a mobile structure.

26. The method of claim 23, wherein said illuminator further comprises one or more substrate layers, said one or more substrate layers provide physical and structural durability for said illuminator.

27. The method of claim 26, wherein said one or more substrate layers are transmissive of at least a portion of radiation, the radiation being at least one of the primary electromagnetic radiation to said one or more luminescent layers or the output radiation from said one or more luminescent layers.

28. The method of claim 23, wherein said illuminator further comprises an emission blocking layer that at least substantially transmits the primary electromagnetic radiation to said one or more luminescent layers and absorbs at least a portion of the output radiation that is not emitted or reflected to the viewing hemisphere.

29. The method of claim 23, wherein said illuminator further comprising a masking layer that substantially renders the visible appearance of said illuminator to a desired color and transmits at least a portion of the primary electromagnetic radiation to said one or more luminescent layers.

* * * * *